US009819530B2

(12) United States Patent
Yaman et al.

(10) Patent No.: US 9,819,530 B2
(45) Date of Patent: Nov. 14, 2017

(54) CONSTELLATION DESIGNS WITH NON-GRAY BIT MAPPING

(71) Applicant: NEC Laboratories America, Inc., Princeton, NJ (US)

(72) Inventors: Fatih Yaman, Monmouth Junction, NJ (US); Shaoliang Zhang, Princeton, NJ (US); Eduardo Mateo Rodriquez, Tokyo (JP); Yoshihisa Inada, Tokyo (JP); Takaaki Ogata, Tokyo (JP); Takanori Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/079,848

(22) Filed: Mar. 24, 2016

(65) Prior Publication Data
US 2016/0285668 A1     Sep. 29, 2016

Related U.S. Application Data

(60) Provisional application No. 62/137,412, filed on Mar. 24, 2015.

(51) Int. Cl.
*H04L 27/36*     (2006.01)
*H04L 27/34*     (2006.01)

(52) U.S. Cl.
CPC ........ *H04L 27/362* (2013.01); *H04L 27/3405* (2013.01); *H04L 27/3444* (2013.01); *H04L 27/34* (2013.01); *H04L 27/36* (2013.01)

(58) Field of Classification Search
CPC ... H04L 27/36; H04L 27/362; H04L 27/3405; H04L 27/34
See application file for complete search history.

(56) References Cited

U.S. PATENT DOCUMENTS

| | | | |
|---|---|---|---|
| 2009/0052576 A1* | 2/2009 | Golitschek | H04L 27/34 375/298 |
| 2009/0161786 A1* | 6/2009 | Nakagawa | H03M 13/256 375/286 |
| 2010/0329314 A1* | 12/2010 | Liebl | H04L 27/183 375/219 |
| 2011/0228869 A1 | 9/2011 | Barsoum et al. | |

(Continued)

OTHER PUBLICATIONS

Gerard J. Foschini et al., Optimization of Two-Dimensional Signal Constellations in the Presence of Gaussian Noise, IEEE Transactions on Communications, vol. Com-22, No. 1, Jan. 1974.

(Continued)

*Primary Examiner* — Sophia Vlahos
(74) *Attorney, Agent, or Firm* — Joseph Kolodka

(57) ABSTRACT

Methods and systems for communication with an optimized constellation include coding an input data stream to a symbol stream according to an optimized constellation that has a non-Gray bit mapping and that has neighboring points having more than one bit difference farther apart than neighboring points having one bit difference. The symbol stream is modulated onto a transmission signal and subsequently demodulated at a receiver to produce a received symbol stream. The received symbol stream is decoded to a bitstream according to an optimized constellation that has a non-Gray bit mapping and that has neighboring points having more than one bit difference farther apart than neighboring points having one bit difference.

9 Claims, 8 Drawing Sheets

(56) References Cited

U.S. PATENT DOCUMENTS

| 2011/0243266 | A1* | 10/2011 | Roh | H04L 27/3472 375/261 |
| 2015/0146810 | A1* | 5/2015 | Bae | H04L 27/38 375/262 |
| 2015/0372852 | A1* | 12/2015 | Delaruelle | H04L 1/0057 375/298 |
| 2016/0233982 | A1* | 8/2016 | Fujimori | H04L 27/38 |

OTHER PUBLICATIONS

Jun Tan et al., Analysis and Design of Symbol Mappers for Iteratively Decoded BICM, IEEE Transactions on Wireless Communications, vol. 4, No. 2., Mar. 2005.

* cited by examiner

CONSTELLATION DESIGNS WITH NON-GRAY BIT MAPPING

RELATED APPLICATION INFORMATION

This application claims priority to provisional application 62/137,412, filed Mar. 24, 2015, the contents thereof being incorporated herein by reference.

BACKGROUND OF THE INVENTION

Optical communications use a variety of different modulation schemes to encode information on an optical signal. In quadrature amplitude modulation (QAM), for example, an in-phase and a quadrature signal, ninety degrees out of phase from one another, are amplitude-modulated to encode information. The result is a signal constellation, which maps the different bit sequences that are possible by any given combination of amplitude levels on the two signals. For a four-point QAM constellation, each point (known as a "symbol") encodes two bits. For an eight-point QAM constellation, each symbol encodes three bits.

When assigning bit sequences to a constellation, care is taken to ensure that the difference in the sequences encoded by one symbol and a neighboring symbol have as many bits in common as possible. For example, in a four-symbol QAM (4QAM), the sequence 11 may have 01 and 10 as its neighbors. This is done to minimize the effect of errors in detection, where the most likely error is that a symbol is mistaken for its neighbor.

However, while the neighbors would ideally differ by at most one bit, this is not possible for every constellation. This encoding, called Gray coding, is not applicable to eight-symbol QAM (8QAM). Because actual Gray mapping is not available in 8QAM, some existing systems use iterative coding, which is more computationally expensive than Gray coding and is difficult to implement at high speeds. As a result, existing 8QAM systems perform beneath their optimal abilities.

BRIEF SUMMARY OF THE INVENTION

A method implemented in a user equipment used in a communications system includes coding an input data stream to a symbol stream according to an optimized constellation that has a non-Gray bit mapping and that has neighboring points having more than one bit difference farther apart than neighboring points having one bit difference. The symbol stream is modulated onto a transmission signal.

A method implemented in a user equipment used in a communications system includes demodulating a received signal to produce a symbol stream. The symbol stream is decoded to a bitstream according to an optimized constellation that has a non-Gray bit mapping and that has neighboring points having more than one bit difference farther apart than neighboring points having one bit difference.

A transmitter/receiver used in a communications system, the transmitter/receiver includes a coder comprising a processor configured to code an transmission data stream to a transmission symbol stream according to an optimized constellation that has a non-Gray bit mapping and that has neighboring points having more than one bit difference farther apart than neighboring points having one bit difference. A modulator is configured to modulate the transmission symbol stream onto a transmitting signal. A demodulator is configured to demodulate a received signal to produce a received symbol stream. A decoder is configured to decode the received symbol stream to a received data stream according to the optimized constellation.

DETAILED DESCRIPTION

Embodiments of the present principles provide a constellation for eight-symbol quadrature amplitude modulation (8QAM) that optimizes the spacing between symbols in accordance with the strength of the coding between those symbols. In particular, although Gray coding is not available for 8QAM constellations, and although some neighboring symbol sequence pairs will have only one bit of overlap, that weakness can be compensated for by locating the weaker neighbors farther apart from one another, at the expense of moving them closer to neighbors with which they have a stronger coding relationship. This produces a net benefit to signal-to-noise ratio.

Figure 1:
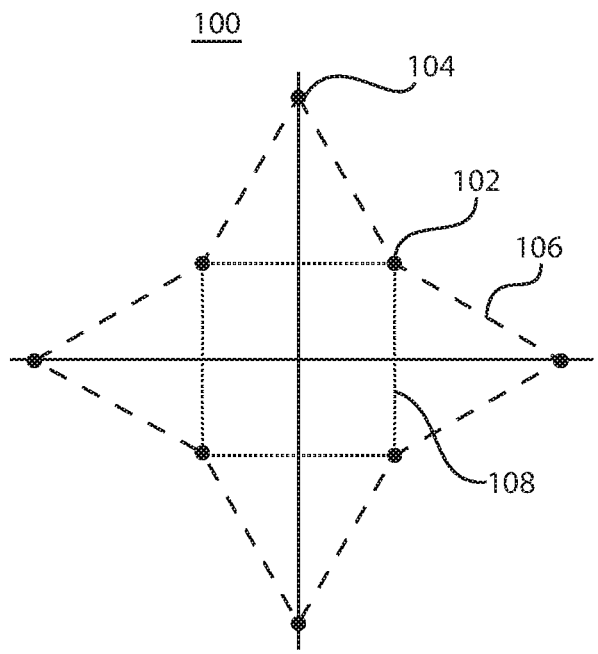
FIG. 1 is directed to an 8-symbol quadrature amplitude modulation (8QAM) constellation.

Referring now to FIG. 1, an exemplary 8QAM constellation 100 is shown according to an exemplary first bit mapping. The x-axis of the constellation 100 represents the amplitude of the in-phase signal (I) and the y-axis represents the amplitude of the quadrature signal (Q). The constellation 100 is formed from eight symbols, each occupying a different point on the constellation 100 that corresponds to different amplitudes of the I and Q signals. In this example, each of the points has an identical distance from each of its neighbors, such that an error in symbol detection is just as likely to be misread as one neighboring point as any other neighboring point. It should be recognized that, although the present embodiments are described specifically in the context of 8QAM, they can also be applied to other constellations that may have larger number of symbols, including constellations that are defined in higher dimensions (such as, e.g., four dimensions).

In prior art that focuses on optimizing constellations, or finding the best constellation geometry by optimizing the location of the constellation points focused on maximizing the Euclidean distance between the constellation points [1]. In particular maximizing the minimum Euclidean distance between the constellation points. Note that there are multiple constellation points and there are a multitude of Euclidean distances between different constellation points, one of which is the smallest of all. The prior art tries to make sure the smallest Euclidean distance is maximized. In this embodiment, we minimize the bit-error-rate (BER) directly which takes into account the actual bit mapping.

FIG. 1 shows two kinds of neighboring connection. A first neighboring relationship 106 is represented by a dashed line and, in constellation 100, connects points on an outer ring 104 to points on an inner ring 102. A second neighboring relationship 108 is represented by a dotted line and, in constellation 100 connects points on the inner ring 102 to one another. The lengths of these connections are identical in the conventional constellation.

Figure 2:
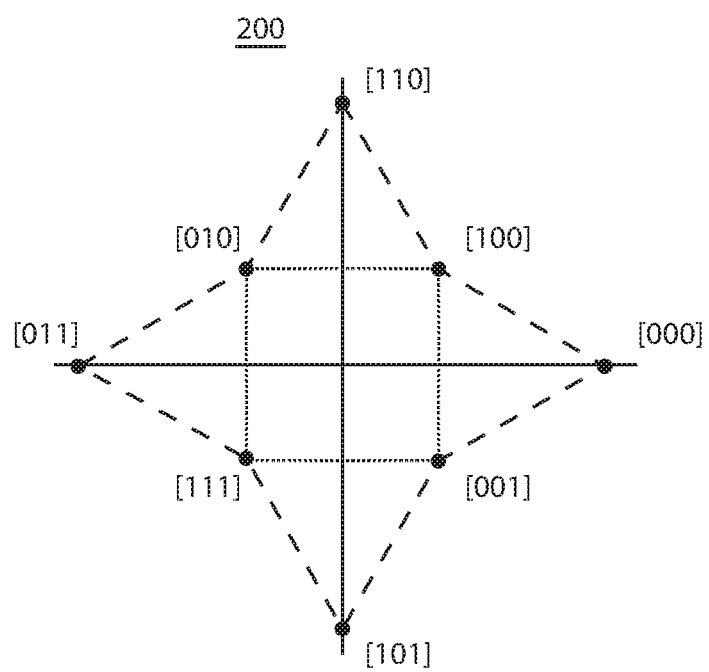
FIG. 2 is directed to a partially Gray-coded 8QAM constellation.

Referring now to FIG. 2, points of the constellation 200 are mapped to specific bit sequences. It is immediately apparent from the figure that those neighbors connected by a dashed line (the first neighboring relationship 106) differ in their respective bit sequences by a single bit. The neighbors that are connected by dotted lines (the second neighboring relationship 108), however, differ in their respective bit sequences by two bits. As a result, this coding is less effective than a Gray coding at limiting the negative impact of a detection error.

Figure 3:
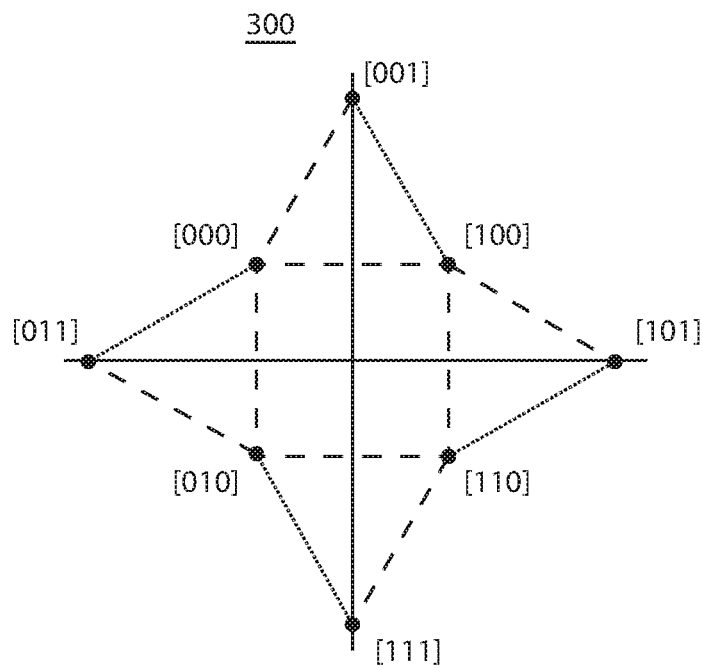
FIG. 3 is directed to a partially Gray-coded 8QAM constellation.

Referring now to FIG. 3, a second exemplary bit sequence mapping is shown. In this mapping, there are again a set of neighboring relationships 108, represented by the dotted lines, that encode a difference of two bits in the sequences of the respective neighboring points. In this case, the weaker coding neighbors are along the outside of the constellation 300.

In both of the exemplary mappings described above, the strength of the constellations is inconsistent, with a detection failure for some points resulting in a greater error than would a failure for other points. Performance of a constellation depends on both the Euclidean distance between points for a given signal power and the strength of the bit mapping. A conventional 8QAM constellation, such as those shown above, is optimized to have the smallest Euclidean distances in the two dimensions of the constellation. However, whereas a perfect Gray mapping can be implemented for many constellations, it is unavailable in 8QAM as shown above.

To address this problem, the present embodiments use constellations that lengthen the distance between neighbors that have a weaker coding relationship between them. This decreases the likelihood that those points will suffer a detection failure, moving some of the failure likelihood to points that have stronger coding relationships, resulting in a net improvement in bit error rate (BER).

Figure 4:
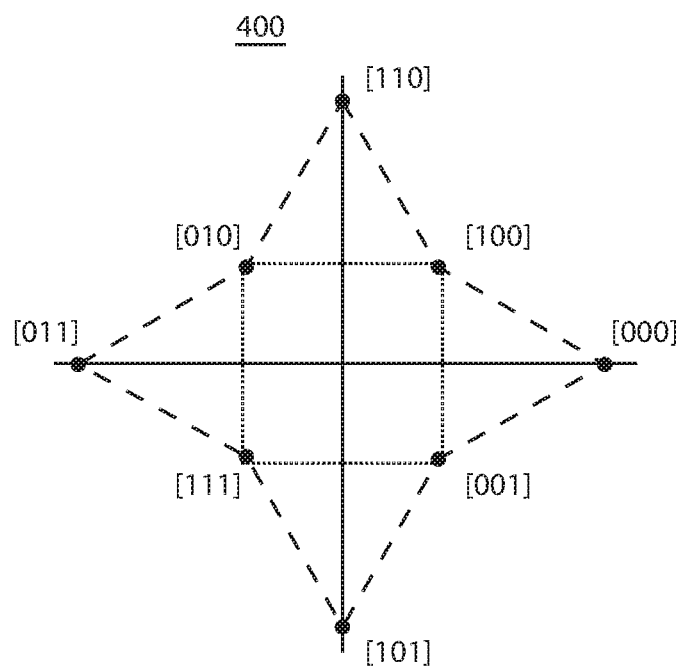
FIG. 4 is directed to a modified 8QAM constellation in accordance with the present principles.

Referring now to FIG. 4, a first optimized 8QAM constellation 400 is shown. In this first optimized 8QAM constellation, the bit mapping corresponds to that of FIG. 2 above, but the positions of the inner ring of points 102 are changed, such that the distances between each of the points on the inner ring 102 is increased and the distances between the points on the inner ring 102 and those on the outer ring 104 is decreased.

Because the points on the inner ring 102 have two bits of difference between them, they generate more errors. Increasing the radius of the inner ring 102 increases the Euclidean distance between the points on the inner ring 102, at the expense of decreasing the Euclidean distance between the points on the inner ring 102 and the points on the outer ring 104.

Figure 5:
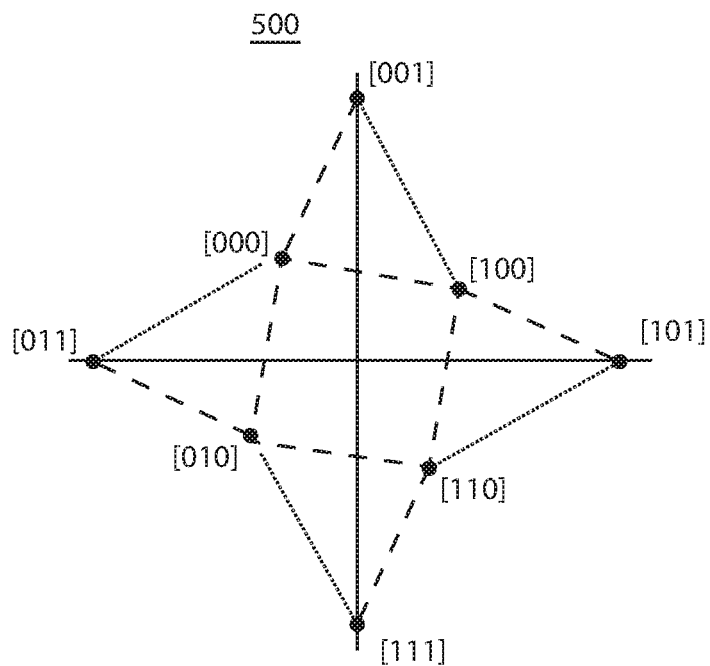
FIG. 5 is directed to a modified 8QAM constellation in accordance with the present principles.

Referring now to FIG. 5, a second optimized 8QAM constellation 500 is shown. In the second optimized constellation 500, to lengthen the distances represented by the dotted lines, the inner ring 102 is rotated and the radius of the inner ring 102 is decreased somewhat. As with the first optimized constellation 400, the second optimized constellation 500 decreases the Euclidean distances between those neighboring points which differ from one another by a single bit, while increasing the Euclidean distances between those neighboring points which differ from one another by two bits.

The present embodiments therefore modify the conventional 8QAM constellation 100 in one of two ways, either by changing the radius of the inner ring 102 alone, or by both changing the radius of the inner ring 102 and rotating that ring, depending on the particular mapping that is employed. The optimal adjustment depends on the signal-to-noise ratio (SNR) at which the system is operating. As an example, a signal may be transmitted a short distance, in which case it would be operating at a high SNR, or it may be operating at the longest distance it possibly can, where it would be operating at a low SNR condition. A common parameter used to define the signal quality is the Q factor. Q factor increases almost linearly with signal SNR and it is an indicator of the level of BER. For very high SNRs, the optimum adjustment of the inner ring 102 approaches zero, as the likelihood of a detection error increases and the deficiencies of the bit coding become less relevant. Conversely, at lower SNRs, optimum performance is attained using progressively larger inner rings 102.

Figure 6:
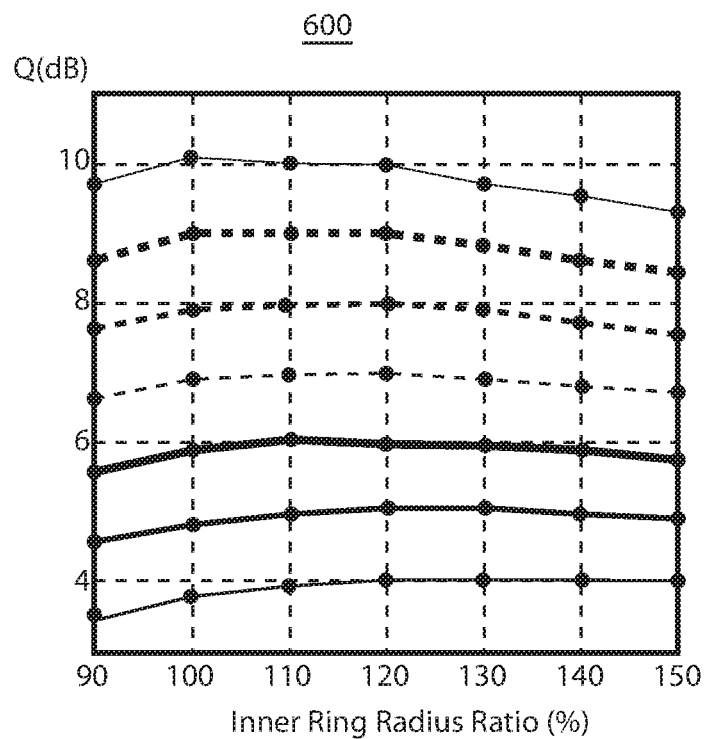
FIG. 6 is a graph illustrating a comparison of peak Q factors at different signal-to-noise ratios according to an inner ring radius in accordance with the present principles.

Referring now to FIG. 6, a graph 600 illustrating the relationship between inner ring size for the first optimized 8QAM constellation 400, SNR, and performance is shown. The graph 600 shows plots for different SNRs, from 8 db to 14 dB at 1 dB intervals, with the horizontal axis representing the ratio of the modified inner ring radius to the original inner ring radius and the vertical axis representing decoded signal quality. For each SNR level, the inner ring radius ratio of 100% represents an inner ring that is the same size as that of the conventional 8QAM constellation 200. At each SNR level, the optimal inner ring radius ratio is given by the maximum point of the curve.

In one exemplary embodiment of optical communications, a limit to practical communications (e.g., a longest distance at which the signal can be accurately received) corresponds to an SNR regime of about 8 dB to about 10 dB for 8QAM. At this SNR level, the corresponding Q factor is about 4-6 dB. In this operational range, the optimum radius for the inner ring 102 in the optimized constellation 400 is about 120% of the size of the inner ring 102 in the conventional constellation 200. The optimized constellation 400 outperforms the conventional constellation 200 by about 0.2 dB.

Figure 7:
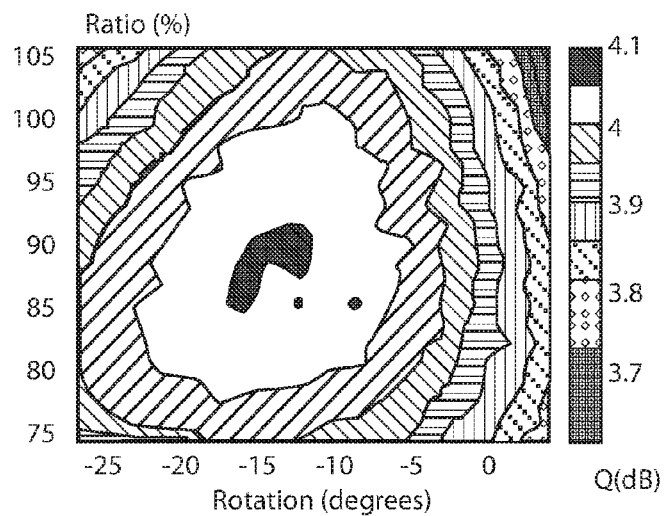
FIG. 7 is a heat map illustrating a comparison of peak Q factors at different signal-to-noise ratios according to an inner ring radius and an inner ring rotation in accordance with the present principles.

Referring now to FIG. 7, an exemplary heat map 700 is shown that illustrates the relationship between rotation of the inner ring 102, ratio of the inner ring radius to the original inner ring size shown in FIG. 3, and performance Q measured in dB. The heat map 700 is shown for a particular SNR (in this case 8 dB) and is formed using a Monte Carlo method. In this particular case, an inner ring 102 that is about 90% of the conventional inner ring size, at a rotation of about 15°, provides the optimal performance at an SNR of 8 dB. At high SNRs, the rotation will approach zero and the ratio will approach 100%. This optimization can increase performance by about 0.3 dB or more.

Figure 8:
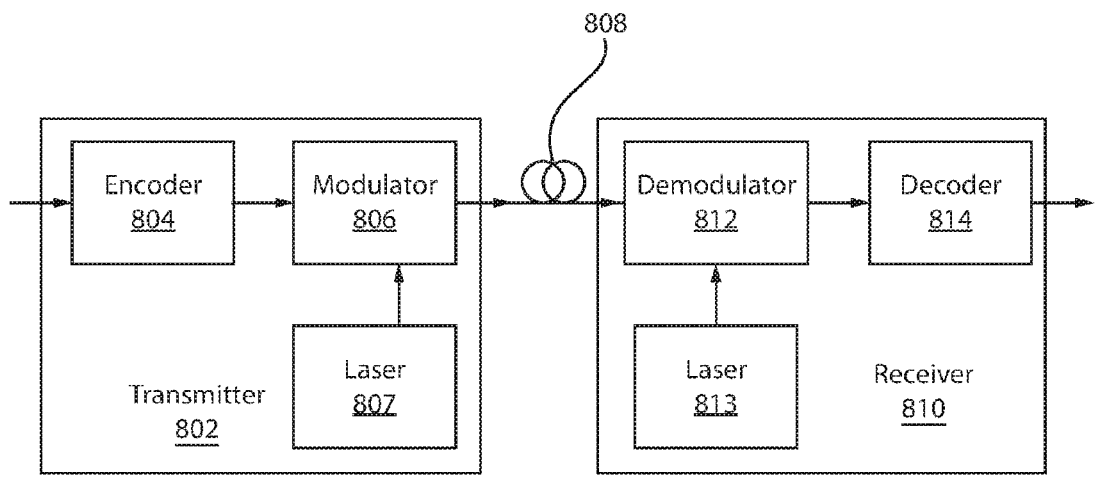
FIG. 8 is a block diagram of a communications system in accordance with the present principles.

Referring now to FIG. 8, a transmission system 800 is shown. A transmitter 802 takes a sequence of input bits. An encoder 804 in the transmitter 802 accepts a bit sequence as an input and assigns the input to corresponding symbols on an optimized constellation (e.g., 400 or 500). The encoder 804 may add additional information, such as error checking bits, using any appropriate error correction coding scheme such as, e.g., a low-density parity-check code. The encoder 802 outputs symbol control information to modulator 806.

The modulator 806 uses the symbol control information to change respective amplitudes of I and Q signals. It is specifically contemplated that the I and Q signals may be carried by, e.g., a laser 807 or other local light source, but it should be understood that any appropriate signal medium may be used. The signal may then be launched over a transmission medium 808 such as, e.g., a fiber optic cable.

At the other end of the transmission medium 808 is a receiver 810. A coherent receiver and demodulator 812 uses a local laser 813 to determine the amplitude of the I and Q signals and finds the closest point on the optimized constellation. The demodulator 812 then outputs the corresponding symbol to decoder 814, which determines an associated bit stream and performs any additional error correction decoding using, e.g., the low-density parity-check code. The decoder 814 then provides an output bit stream.

Figure 9:
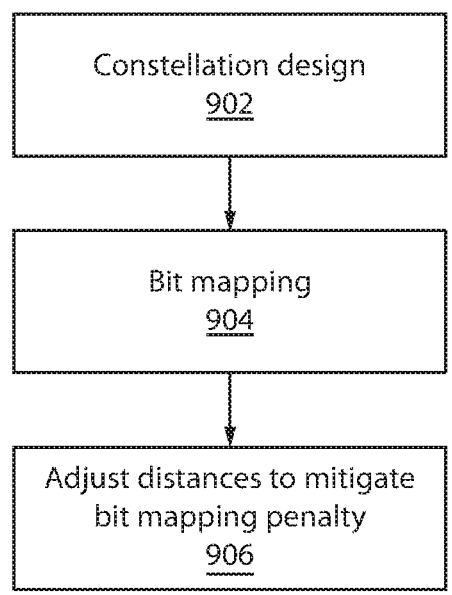
FIG. 9 is a block/flow diagram of a method of designing an optimized constellation in accordance with the present principles.

Referring now to FIG. 9, a method for determining an optimal constellation is shown. Block 902 designs the initial constellation. In the case of 8QAM, this may include the constellation 100, which has equal Euclidean distances between all neighboring points. Block 904 then assigns bit sequences to each of the points on the constellation. Block 904 attempts to create a bit mapping that is as close to Gray mapping as possible, but it is specificallycontemplated that the geometries permitted by the constellation do not allow a perfect Gray mapping. As such, at least some neighboring points on the constellation will have bit sequences that differ by more than one bit.

Block 906 then adjusts the constellation to mitigate the bit mapping penalty incurred by having neighboring constellation points with more than one bit different. This may be performed by simulation according to a particular SNR, with the radius of an inner ring 102 and orientation of points thereon is selected to optimize the received signal. This adjustment may be performed according to a predetermined, expected SNR, or alternatively may be performed according to a variety of different SNRs, such that the constellation may be changed to adapt to noise conditions.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
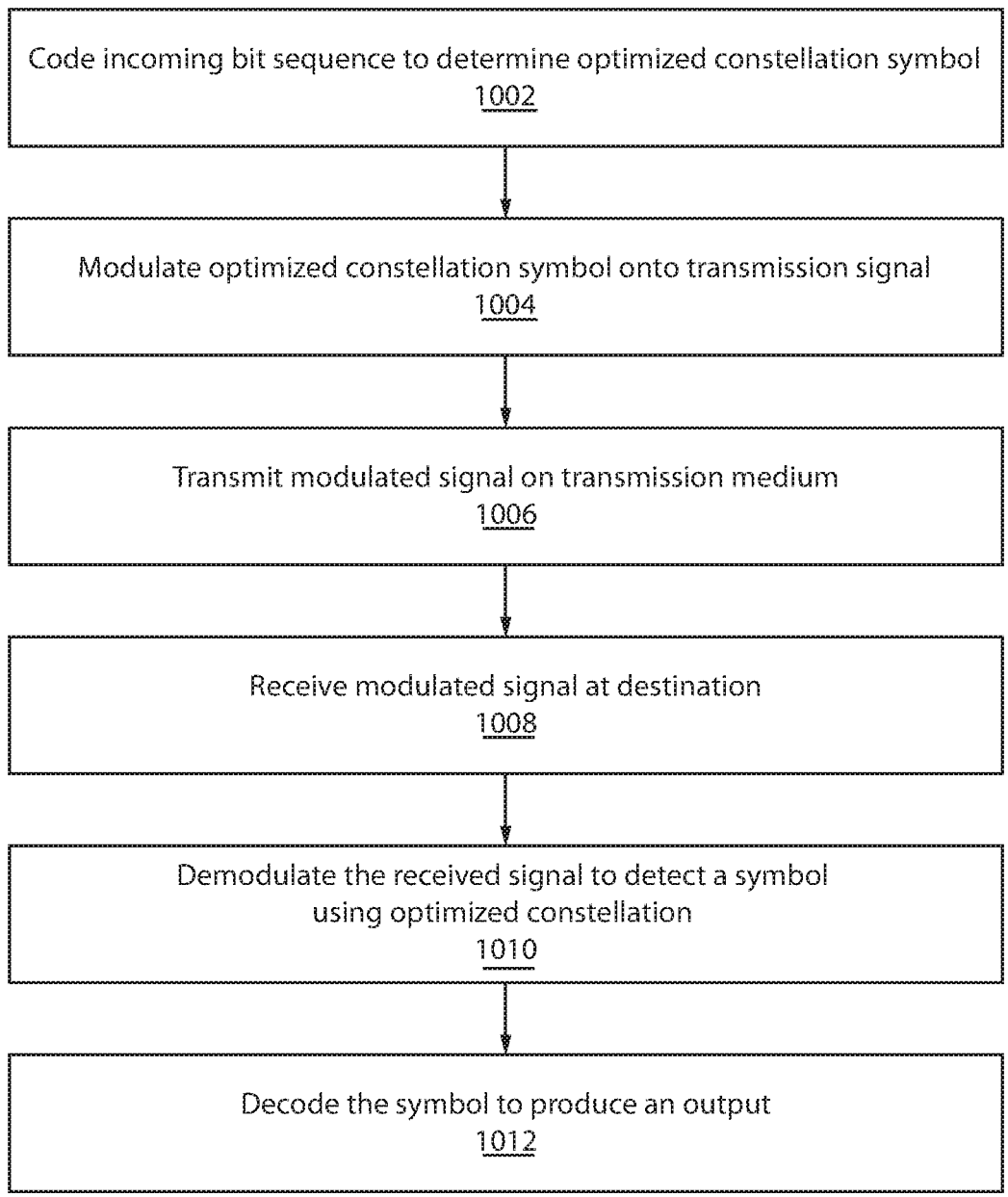
FIG. 10 is a block/flow diagram of a method of communicating with an optimized constellation in accordance with the present principles.

Referring now to FIG. 10, a method for communication is shown. Block 1002 codes an incoming bit sequence in accordance with an optimized constellation such as, e.g., an optimized 8QAM constellation as shown in FIGS. 4 and 5. Block 1002 thereby determines a symbol that corresponds to amplitudes of an I and Q signal. Block 1004 modulates the determined symbol onto a transmission signal such as, e.g., a laser beam or other appropriate signal medium. Block 1006 then launches the modulated transmission signal on a transmission medium 806 such as, e.g., a fiber optic cable.

Block 1008 receives the modulated transmission signal from the transmission medium 806 at the destination. The modulated signal is then demodulated at block 1010 to detect the corresponding symbol using the same optimized constellation as was used by block 1002. Block 1012 then translates the symbol into a corresponding bit sequence and outputs the bit sequence.

Figure 11:
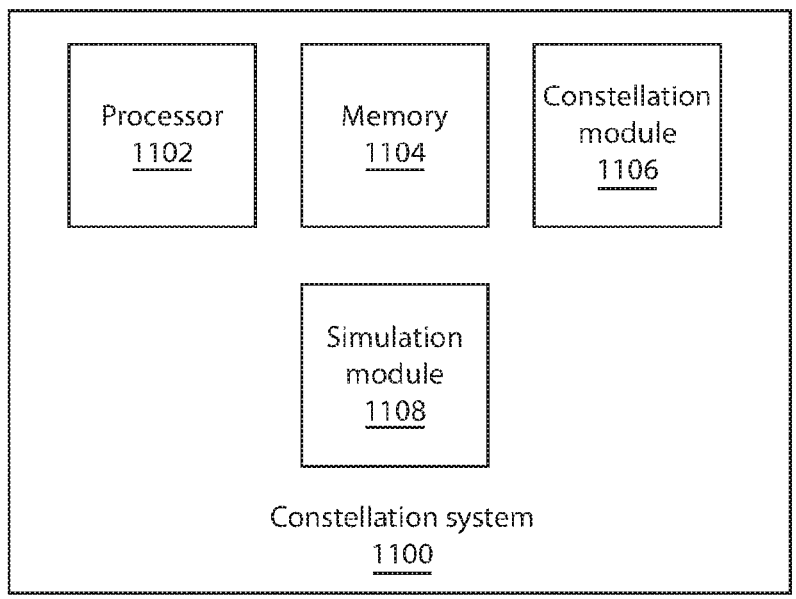
FIG. 11 is a block diagram of a system for optimizing a constellation in accordance with the present principles.

Referring now to FIG. 11, a system 1100 for constellation design and implementation is shown. The system 1100 includes a hardware processor 1102 and memory 1104. The system 1100 may include one or more functional modules as well. The functional modules may be implemented as software that is stored in the memory 1104 and executed by processor 1102. Alternatively, the functional modules may be implemented as one or more discrete hardware components, for example as application-specific integrated chips or field programmable gate arrays.

In particular, the system includes a constellation module 1106 and a simulation module 1108. The constellation module 1106 performs an initial design of the constellation according to, e.g., minimized Euclidean distances between neighboring points and assigned bit sequence mappings to each of points in the constellation. The simulation module 1108 then simulates the constellation at various SNRs with various adjustments (e.g., adjustments to the size of an inner ring of the constellation or adjustments to an orientation of the inner ring relative to an outer ring). Based on the simulations, an optimal constellation for a given SNR is determined and the constellation module 1106 performs an adjustment to the constellation, storing the optimized constellation in memory 1104.

Figure 12:
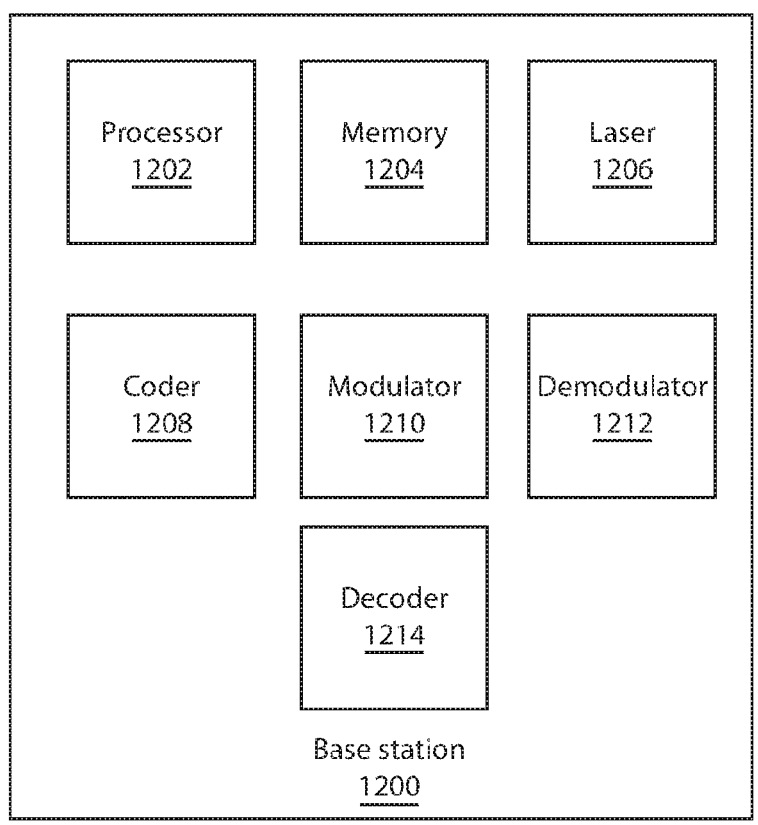
FIG. 12 is a block diagram of a base station system/optical transmitter receiver for communication with an optimized constellation in accordance with the present principles.

Referring now to FIG. 12, a transmitter/receiver 1200 in a communication system is shown. It is specifically contemplated that this transmitter/receiver 1200 may be used in consumer equipment or, alternatively, may be used in a large, commercial grade data communications center. As with the constellation system 1100 described above, the transmitter/receiver 1200 includes a hardware processor 1202 and a memory 1204. In addition, the transmitter/receiver 1200 includes, e.g., a laser 1206 or some other form of signal generating device.

A coder 1208 uses the processor 1202 to convert the bits of an input bitstream into symbols that the modulator 1210 modulates onto a laser beam from laser 1206. This forms an outgoing transmission, which is launched onto a transmission medium such as fiber optic cable 806. Other signals may be received over that transmission medium or over another, at a same wavelength or at some other wavelength. The demodulator 1212 detects symbols within the received signal by measuring, e.g., the amplitude of an I and Q signal therewithin. A decoder 1214 then uses processor 1202 to convert the symbols into a corresponding bitstream and outputs that bitstream.

Figure 13:
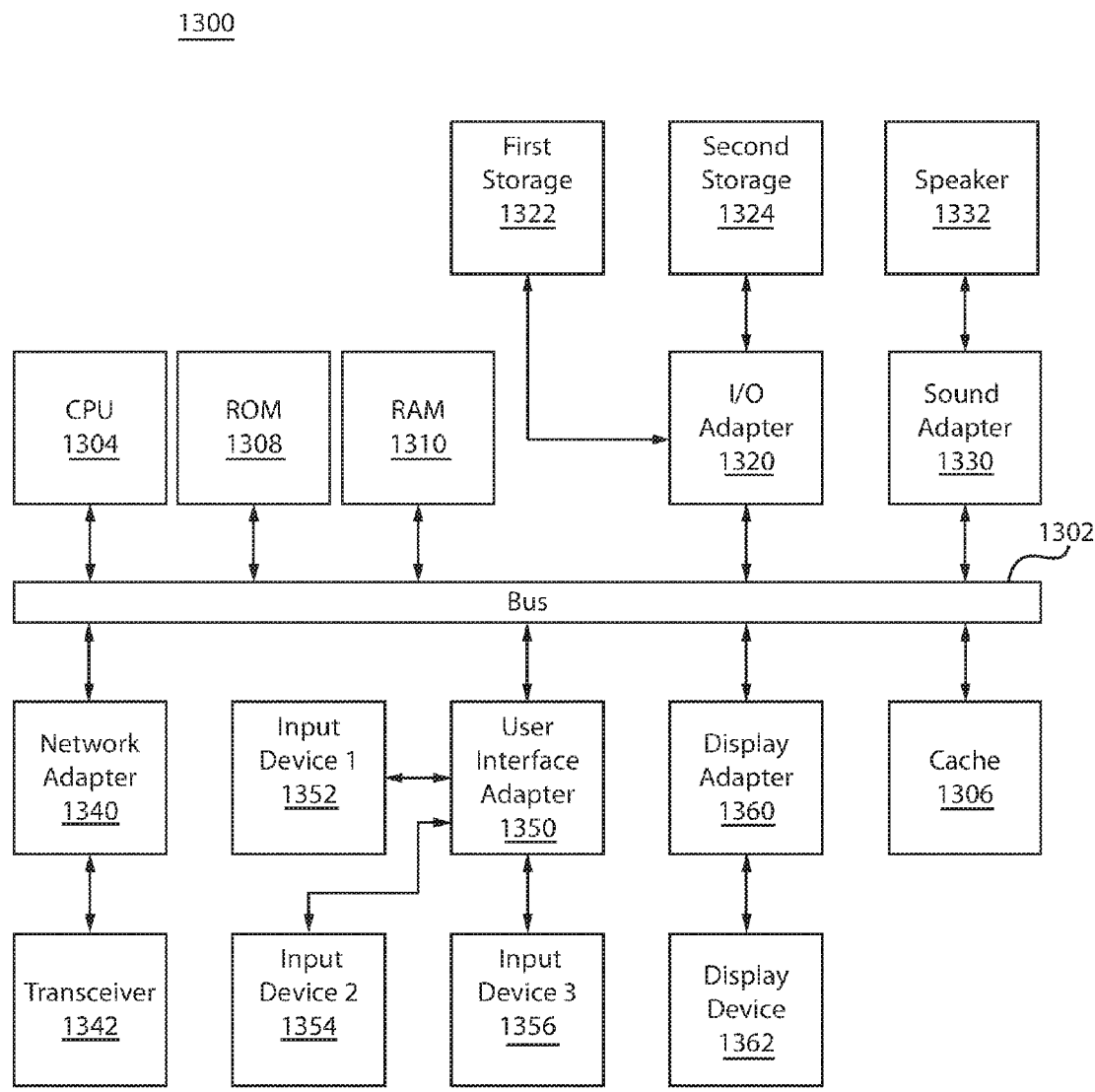
FIG. 13 is a block diagram of a processing system in accordance with the present principles.

Referring now to FIG. 13, an exemplary processing system 1300 is shown which may represent the constellation system 1100 or the transmitter/receiver 1200. The processing system 1300 includes at least one processor (CPU) 1304 operatively coupled to other components via a system bus 1302. A cache 1306, a Read Only Memory (ROM) 1308, a Random Access Memory (RAM) 1310, an input/output (I/O) adapter 1320, a sound adapter 1330, a network adapter 1340, a user interface adapter 1350, and a display adapter 1360, are operatively coupled to the system bus 1302.

A first storage device 1322 and a second storage device 1324 are operatively coupled to system bus 1302 by the I/O adapter 1320. The storage devices 1322 and 1324 can be any of a disk storage device (e.g., a magnetic or optical disk storage device), a solid state magnetic device, and so forth. The storage devices 1322 and 1324 can be the same type of storage device or different types of storage devices.

A speaker 1332 is operatively coupled to system bus 1302 by the sound adapter 1330. A transceiver 1342 is operatively coupled to system bus 1302 by network adapter 1340. A display device 1362 is operatively coupled to system bus 1302 by display adapter 1360.

A first user input device 1352, a second user input device 1354, and a third user input device 1356 are operatively coupled to system bus 1302 by user interface adapter 1350. The user input devices 1352, 1354, and 1356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 1352, 1354, and 1356 can be the same type of user input device or different types of user input devices. The user input devices 1352, 1354, and 1356 are used to input and output information to and from system 1300.

Of course, the processing system 1300 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1300 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method implemented in a user equipment used in a communications system, the method comprising:
    coding an input data stream to a symbol stream using a processor according to an 8-symbol quadrature amplitude modulation optimized constellation that is formed from two concentric rings of points and has a non-Gray bit mapping and that has neighboring points having more than one bit difference farther apart than neighboring points having one bit difference, wherein an inner ring of the two concentric rings of points is rotated relative to an outer ring of the two concentric rings of points such that each point on the outer ring neighbors two inner ring points; and
    modulating the symbol stream onto a transmission signal.

2. The method of claim 1, wherein a Euclidean distance between each outer ring point and a respective first inner ring point is longer than a Euclidean distance between each outer ring point and a respective second inner ring point.

3. The method of claim 1, wherein the optimized constellation is optimized for a predetermined signal-to-noise ratio.

4. A method implemented in a user equipment used in a communications system, the method comprising:
    demodulating a received signal to produce a symbol stream; and
    decoding the symbol stream to a bitstream using a processor according to an optimized 8-symbol quadrature amplitude modulation constellation that is formed from two concentric rings of points and has a non-Gray bit mapping and that has neighboring points having more than one bit difference farther apart than neighboring points having one bit difference, wherein an inner ring of the two concentric rings of points is rotated relative to an outer ring of the two concentric rings of points such that each point on the outer ring neighbors two inner ring points.

5. The method of claim 4, wherein a Euclidean distance between each outer ring point and a respective first inner ring point being longer than a Euclidian distance between each outer ring point and a respective second inner ring point.

6. The method of claim 4, wherein the optimized constellation is optimized for a predetermined signal-to-noise ratio.

7. A transmitter/receiver used in a communications system, the transmitter/receiver comprising:

a coder comprising a processor configured to code an transmission data stream to a transmission symbol stream according to an optimized 8-symbol quadrature amplitude modulation constellation that is formed from two concentric rings of points and has a non-Gray bit mapping and that has neighboring points having more than one bit difference farther apart than neighboring points having one bit difference, wherein an inner ring of the two concentric rings of points is rotated relative to an outer ring of the two concentric rings of points such that each point on the outer ring neighbors two inner ring points;

a modulator configured to modulate the transmission symbol stream onto a transmitting signal;

a demodulator configured to demodulate a received signal to produce a received symbol stream; and a decoder configured to decode the received symbol stream to a received data stream according to the optimized constellation.

8. The transmitter/receiver of claim 7, wherein a Euclidean distance between each outer ring point and a respective first inner ring point being longer than a Euclidian distance between each outer ring point and a respective second inner ring point.

9. The transmitter/receiver of claim 7, wherein the optimized constellation is optimized for a predetermined signal-to-noise ratio.

* * * * *